United States Patent
Kalyankar

(10) Patent No.: US 9,176,259 B2
(45) Date of Patent: Nov. 3, 2015

(54) SOL-GEL BASED ANTIREFLECTIVE (AR) COATINGS WITH CONTROLLABLE PORE SIZE USING ORGANIC NANOCRYSTALS AND DENDRIMERS

(75) Inventor: Nikhil D. Kalyankar, Hayward, CA (US)

(73) Assignee: Intermolecular, Inc., San Jose, CA (US)

( * ) Notice: Subject to any disclaimer, the term of this patent is extended or adjusted under 35 U.S.C. 154(b) by 611 days.

(21) Appl. No.: 13/041,137

(22) Filed: Mar. 4, 2011

(65) Prior Publication Data

US 2012/0225215 A1 Sep. 6, 2012

(51) Int. Cl.
| | | |
|---|---|---|
| *B05D 3/14* | (2006.01) | |
| *B05D 5/00* | (2006.01) | |
| *G02B 1/111* | (2015.01) | |
| *B05D 3/02* | (2006.01) | |
| *B82Y 20/00* | (2011.01) | |
| *C09D 183/04* | (2006.01) | |
| *G02B 1/11* | (2015.01) | |
| *C08L 79/02* | (2006.01) | |
| *C08K 5/54* | (2006.01) | |

(52) U.S. Cl.
CPC .............. *G02B 1/111* (2013.01); *B05D 3/0254* (2013.01); *B05D 3/148* (2013.01); *B05D 5/00* (2013.01); *B82Y 20/00* (2013.01); *C09D 183/04* (2013.01); *C08K 5/54* (2013.01); *C08L 79/02* (2013.01); *G02B 2207/101* (2013.01); *G02B 2207/107* (2013.01); *G02B 2207/109* (2013.01)

(58) Field of Classification Search
CPC ................. B82Y 20/00; C09D 179/00; G02B 2207/107; G02B 2207/109; G02B 1/111
USPC .................................................. 427/243, 535
See application file for complete search history.

(56) References Cited

U.S. PATENT DOCUMENTS

| | | | | |
|---|---|---|---|---|
| 5,744,399 | A * | 4/1998 | Rostoker et al. | 438/622 |
| 7,141,188 | B2 * | 11/2006 | Li et al. | 252/570 |
| 7,381,442 | B2 * | 6/2008 | Lu et al. | 427/96.1 |
| 2003/0012942 | A1 * | 1/2003 | Larsen et al. | 428/304.4 |
| 2005/0171277 | A1 * | 8/2005 | Li et al. | 524/588 |
| 2006/0241194 | A1 * | 10/2006 | Cha et al. | 521/77 |
| 2006/0281329 | A1 * | 12/2006 | RamachandraRao et al. | 438/778 |
| 2007/0212571 | A1 | 9/2007 | Inoguchi | |
| 2008/0317953 | A1 * | 12/2008 | Watkins et al. | 427/244 |
| 2009/0017272 | A1 * | 1/2009 | Phillips et al. | 428/195.1 |
| 2009/0062460 | A1 | 3/2009 | Nakamura | |
| 2009/0299003 | A1 * | 12/2009 | Hawker et al. | 524/600 |
| 2011/0019277 | A1 * | 1/2011 | Sager et al. | 359/580 |

* cited by examiner

*Primary Examiner* — Dah-Wei D Yuan
*Assistant Examiner* — Jose Hernandez-Diaz

(57) ABSTRACT

Embodiments of the invention relate generally to methods and compositions for forming porous low refractive index coatings on substrates. In one embodiment, a method for forming a porous coating on a substrate is provided. The method comprises coating a substrate with a sol-gel composition, comprising at least one porosity forming agent, wherein the porosity forming agent is selected from at least one of dendrimers and organic nanocrystals and removing the at least one porosity forming agent to form the porous coating. Use of at least one of the dendrimers and organic nanocrystals leads to the formation of stable pores with larger volume fraction in the film. Further, the size and interconnectivity of the pores may be controlled via selection of the organic nanocrystal or dendrimer structure, the total organic nanocrystal or dendrimer molecule fraction, polarity of the organic nanocrystal or dendrimer molecule and solvent, and other physiochemical properties of the gel phase.

14 Claims, 2 Drawing Sheets

SOL-GEL BASED ANTIREFLECTIVE (AR) COATINGS WITH CONTROLLABLE PORE SIZE USING ORGANIC NANOCRYSTALS AND DENDRIMERS

BACKGROUND OF THE INVENTION

1. Field of the Invention

Embodiments of the invention relate generally to methods and compositions for forming porous low refractive index coatings on substrates.

2. Description of the Related Art

Coatings that provide low reflectivity or a high percent transmission over a broad wavelength range of light are desirable in many applications including semiconductor device manufacturing, solar cell manufacturing, glass manufacturing, and energy cell manufacturing. The transmission of light through a material causes the wavelength of the light to change, a process known as refraction, while the frequency remains unchanged thus changing the speed of light in the material. The refractive index of a material is a measure of the speed of light in that material which is generally expressed as a ratio of the speed of light in vacuum relative to that in the material. Low reflectivity coatings generally have an optimized refractive index (n) in between air (n=1) and glass (n~1.5).

An antireflective (AR) coating is a type of low reflectivity coating applied to the surface of a transparent article to reduce reflectance of visible light from the article and enhance the transmission of such light into or through the article thus decreasing the refractive index. One method for decreasing the refractive index and enhancing the transmission of light through an AR coating is to increase the porosity of the antireflective coating. Porosity is a measure of the void spaces in a material. Although such antireflective coatings have been generally effective in providing reduced reflectivity over the visible spectrum, the coatings have suffered from deficiencies when used in certain applications. For example, it is often difficult to control pore size and shape. Further, porous AR coatings which are used in solar applications are highly susceptible to moisture absorption. Moisture absorption may lead to an increase in refractive index of the AR coating and corresponding reduction in light transmission.

Thus, there is a need for AR coatings which exhibit increased durability and controllable pore size.

SUMMARY OF THE INVENTION

Embodiments of the invention relate generally to methods and compositions for forming porous low refractive index coatings on substrates. In one embodiment, a method of forming a porous coating on a substrate is provided. The method comprises coating a substrate with a sol-gel composition comprising at least one porosity forming agent, wherein the porosity forming agent is selected from at least one of dendrimers and organic nanocrystals and annealing the coated substrate to remove the at least one porosity forming agent to form the porous coating.

In another embodiment, a composition for forming a sol-gel system is provided. The composition comprises a film forming precursor, an acid or base containing catalyst, an alcohol containing solvent, at least one porosity forming agent selected from at least one of dendrimers and organic nanocrystals, and water.

In yet another embodiment, a method of making a sol-gel system is provided. The method comprises mixing a film forming precursor, an acid or base containing catalyst, water, and an alcohol containing solvent to form a reaction mixture by at least one of a hydrolysis and polycondensation reaction and adding at least one porosity forming agent selected from at least one of dendrimers and organic nanocrystals to the reaction mixture.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
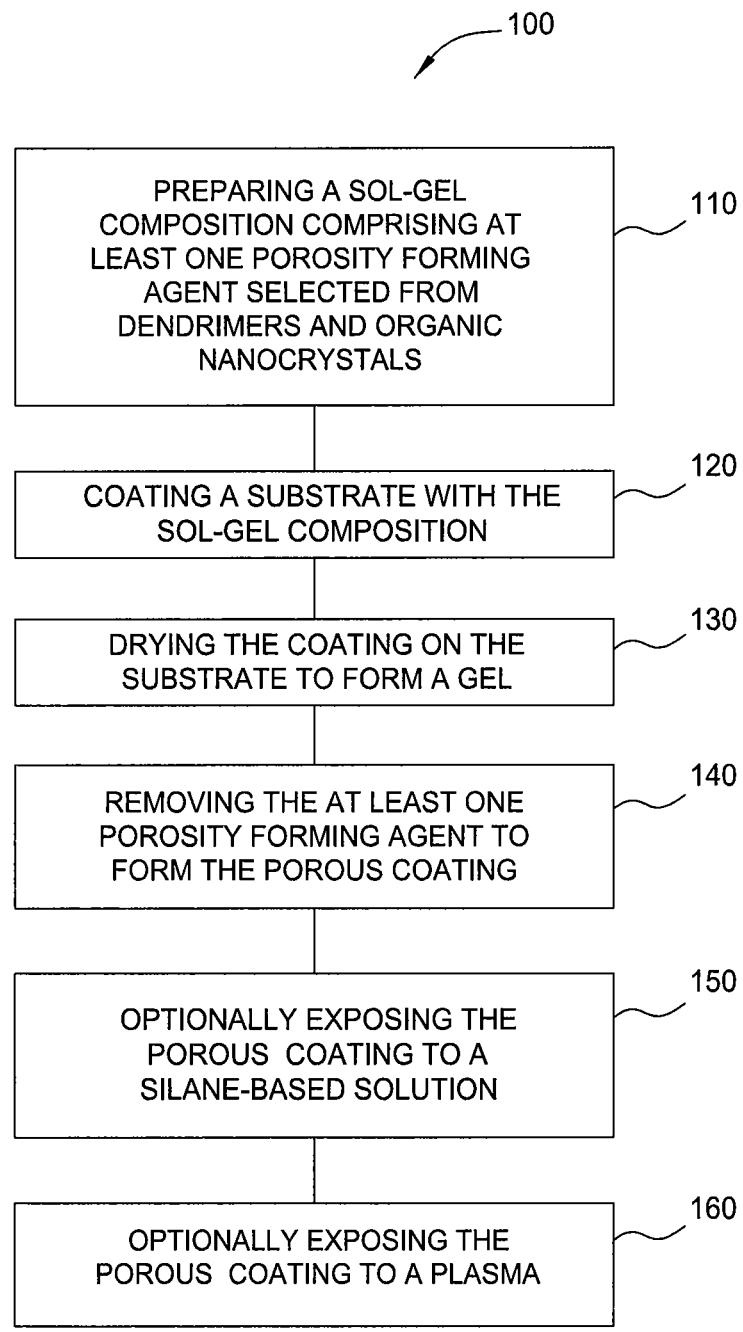
FIG. 1 is a flow chart of one embodiment of a method for forming a low refractive index porous coating on a substrate according to embodiments described herein.

Embodiments of the invention relate generally to methods and compositions for forming porous low refractive index coatings on transparent substrates. More specifically, embodiments of the invention relate generally to sol-gel processes and sol-gel compositions for forming low refractive index coatings on transparent substrates.

The term "dendrimer" as used herein is a spheroid or globular nanostructure that may be engineered to carry molecules encapsulated in their interior void spaces or attached to the surface. Size, shape, and reactivity are determined by generation (shells) and chemical composition of the core, interior branching, and surface functionalities. Dendrimers are constructed through a set of repeating chemical synthesis procedures that build up from the molecular level to the nanoscale region. Such repeated branching causes the dendrimer diameter to increase linearly whereas the number of surface groups increases geometrically. The control over size, shape, and surface functionality makes dendrimers one of the customizable commercially available nanotechnologies. Dendrimers can be considered to have three major portions: a core, repeating branching units, and surface functional groups. A dendrimer can be synthesized to have different functionality in each of these portions to control properties such as solubility, thermal stability, hydrophobicity, and attachment of compounds for particular applications. Different functionalities may be achieved by attaching "reactive groups" or "functional groups" with different properties to the portions of the dendrimer. For example, dendrimers may be made water soluble by functionalizing their outer shell or surface with charged species or other hydrophilic groups and dendrimers may be made hydrophobic by functionalizing their outer shell or surface with hydrophobic functional groups. Dendrimers may be classified by generation which refers to the number of repeated branching cycles that are performed during synthesis. For example, if a dendrimer is made by convergent synthesis, and the branching reactions are performed onto the core molecule four times, the resulting dendrimer is considered to be a fourth generation (G4) dendrimer. Each successive generation results in a dendrimer that is roughly twice the size of the previous generation. The ability to control the number of branching cycles allows for precise control of the size, shape, and functionality of the dendrimer. This precise control of size and shape advantageously provides control over the pore size in the porous coating described herein.

The term "micelle" as used herein is an aggregate of surfactant molecules dispersed in a liquid colloid. A typical micelle in aqueous solution forms an aggregate with the hydrophobic head regions of the surfactant molecules in contact with the surrounding solvent, sequestering the hydrophobic tail regions of the surfactant molecules in the micelle center. This phase is caused by insufficient packing issues of single tailed lipids in a bilayer. The difficulty filling all the volume of the interior of a bilayer, while accommodating the area per head group leads to the formation of the micelle. Micelles are approximately spherical in shape. However, other shapes such as ellipsoids, cylinders, and bi-layers are also possible. The shape and size of a micelle is a function of the molecular geometry of its surfactant molecules and solution conditions such as surfactant concentration, temperature, pH, and ionic strength. The shape and size of the micelle will also dictate pore size and shape in the final coating.

The term "molecular porogen" as used herein is any chemical compound capable of forming a sol-gel composition which burns off upon combustion to form a void space or pore.

The term "organic nanocrystals" as used herein includes any organic nanomaterial with at least one dimension less than 100 nanometers and that is single crystalline or polycrystalline.

The term "porosity" as used herein is a measure of the void spaces in a material, and may be expressed as a fraction, the "pore fraction" of the volume of voids over the total volume, between 0 and 1, or as a percentage between 0 to 100%.

The term "self assembling molecular porogens" as used herein is a molecular porogen, generally comprising surfactant molecules, which adopts a defined arrangement without guidance or management from an outside source. Assembly is generally directed through noncovalent interactions as well as electromagnetic interactions. One example is the formation of micelles by surfactant molecules above a critical micelle concentration.

The term "sol-gel composition" as used herein is a chemical solution comprising at least a film forming precursor and a porosity forming agent. The film forming precursor forms a polymer which upon annealing forms a conformal coating.

The term "sol-gel process" as used herein is a process where a wet formulation (the "sol") is dried to form a gel coating having both liquid and solid characteristics. The gel coating is then heat treated to form a solid material. The gel coating or the solid material may be formed by applying a thermal treatment to the sol. This technique is valuable for the development of coatings because it is easy to implement and provides films of uniform composition and thickness.

The term "sol-gel transition point" as used herein refers to the transition of a sol to a gel at the gel point. The gel point may be defined as the point at which an infinite polymer network first appears. At the gel point, the sol becomes an Alcogel or wet gel.

The term "surfactant" as used herein is an organic compound that lowers the surface tension of a liquid and contains both hydrophobic groups and hydrophilic groups. Thus the surfactant contains both a water insoluble component and a water soluble component.

Certain embodiments of the invention relate to a wet chemical film deposition process using a specific sol-gel system including at least one porosity forming agent selected from at least one of dendrimers and organic nanocrystals to produce porous coatings with a low refractive index (e.g. lower than glass). The at least one porosity forming agent will decompose or combust to form voids of a desired size and shape upon heating. Use of the porosity forming agent leads to the formation of stable pores with larger volume and an increased reduction in the refractive index of the coating. Further, the size and interconnectivity of the pores may be controlled via selection of the porosity forming agent, the total porosity forming agent fraction, polarity of the molecule and solvent, and other physiochemical properties of the gel phase.

In addition to the porosity forming agent, the sol-gel system further includes a film forming precursor which forms the primary structure of the gel and the resulting solid coating. Exemplary film forming precursors include silicon containing precursors or titanium containing precursors. The sol-gel system may further include alcohol and water as the solvent system, either an inorganic or organic acid or base as a catalyst or accelerator. A combination of the aforementioned chemicals leads to formation of sols through hydrolysis and condensation reactions. Various coating techniques, including dip-coating, spin coating, spray coating, roll coating, capillary coating, and curtain coating as examples, may be used to coat thin films of these sols onto a solid substrate (e.g., glass). The deposited wet thin films may then be heat treated to remove excess solvent and annealed at an elevated temperature to create a polymerized —Si—O—Si— or —Ti—O—Ti— network and remove all excess solvent and reaction products formed by oxidization of the porosity forming agent, thus leaving behind a porous film with a low refractive index, where n is less than 1.3, to ultra low refractive index where n is less than 1.2. Various methods may be used to impart hydrophobicity and dust resistance (self cleaning) to these porous low refractive index films. These methods may further include application of a hydrophobic self assembled monolayer after AR coating formation and sealing of the pores using a plasma treatment or molecular masking layer such as a few nanometers thick of a metal oxide layer.

The low refractive index porous coatings formed by sol-gel processes described herein may be further developed using combinatorial methods of optimizing the sol-gel compositions and conditions used to create those coatings. Combinatorial processing may include any processing that varies the processing conditions in two or more substrates or regions of a substrate. The combinatorial methodology includes multiple levels of screening to select the coatings for further variation and optimization. Exemplary combinatorial methods and apparatus are described in co-pending U.S. patent application Ser. No. 12/970,638, filed Dec. 16, 2010 and titled HIGH-THROUGHPUT COMBINATORIAL DIP-COATING APPARATUS AND METHODOLOGIES.

FIG. 1 is a flow chart of one embodiment of a method 100 for forming a low refractive index porous coating on a substrate according to embodiments described herein. The low refractive index porous coating may be a porous oxide coating such as a porous silicon oxide ($Si_xO_y$) coating or a porous titanium oxide ($Ti_xO_y$) coating. At block 110, a sol-gel composition comprising at least one porosity forming agent selected from at least one of dendrimers and organic nanocrystals is prepared.

In one embodiment, the sol-gel composition may be prepared by mixing a film forming precursor, an acid or base containing catalyst, and a solvent system containing alcohol and water to form a reaction mixture by at least one of a hydrolysis and polycondensation reaction. The reaction mixture may be stirred at room temperature or at an elevated temperature (e.g., 50-60 degrees Celsius) until the reaction mixture is substantially in equilibrium (e.g., for a period of 24 hours). The reaction mixture may then be cooled and additional solvents added to reduce the ash content if desired.

In certain embodiments, the porosity forming agent may be added to the reaction mixture prior to stirring the reaction mixture. If the porosity forming agent is added to the reaction mixture prior to stirring, the porosity forming agent may play a part in the hydrolysis and condensation reactions. In certain embodiments, the porosity forming agent may be added to the reaction mixture subsequent to stirring the reaction mixture.

In certain embodiments, the porosity forming agent may be accompanied by a surface active agent (e.g., a surfactant) to stabilize and disperse the porosity forming agent in the sol phase of the formulation.

In embodiments where a base catalyst is used, it may be preferable to add the porosity forming agent after stirring the reaction mixture. Sol-gels formed using base catalysts exhibit the formation of particles and that such particles may encapsulate the dendrimers or organic nanocrystals thus limiting or preventing their outgassing upon heating which forms the pores of controllable size and shape.

The dendrimers used in the embodiments described herein may have a molecular weight between 500 and 1,000,000. The dendrimers used in the embodiments described herein may have a molecular weight between 1,000 and 30,000. The dendrimers used in the embodiments described herein may be between first generation (G1) and tenth generation (G10). The dendrimers used is the embodiments described herein may have an average diameter between about 1 nm and about 10 nm. The dendrimers used in the embodiments described herein may contain at least one functional group that is a hydrophobic group. The at least one hydrophobic group may contain at least one halogen (e.g., fluorine, chlorine, bromine, or iodine). Other exemplary functional groups include acetonide, hydroxyl, carboxyl, stearic acid ester, polyethylene glycol (PEG), coconut fatty acid ester, aromatic nitro, aromatic amines, tetracene, anthracene, and fullerenes such as $C_{60}$ fullerene.

Exemplary dendrimers may be selected from the group comprising: poly(amidoamine) (PAMAM) dendrimers, poly (propylene imine) (PPI) dendrimers, bis-MPA dendrimers, trimethylol propane (TMP)-cored dendrimers, and combinations thereof. Exemplary dendrimers are commercially available from Dendritic Nanotechnologies, Inc™ under the tradename STARBURST® PAMAM dendrimers.

Additional materials which may be used in place of or in conjunction with dendrimers include dendritic materials such as dendrons, hyperbranched polymers, and linear dendritic hybrids. Dendrons are dendritic wedges that may comprise one type of functionality at the core and another type of functionality at the periphery. Exemplary dendrons include acetylene dendrons, azide dendrons, allyl dendrons, amine dendrons, benzyl dendrons, carboxyl dendrons, and thiol dendrons. Exemplary hyperbranched polymers include polyester hyperbranched polymers and polyester amide hyperbranched polymers. Exemplary hyperbranched polymers are available from The Polymer Factory under the tradename Polyester Amide —HYBRANE®. Exemplary linear dendritic hybrids include polyethylene glycol (PEG) cores with hydroxyl end functionality.

Organic nanocrystals include any organic nanomaterial with at least one dimension less than 100 nanometers and that is single crystalline or polycrystalline. The organic nanocrystals used with the embodiments described herein may have a size between about 1 nanometer and about 10 nanometers. The organic crystals may be grown in-situ in the sol-gel or may be grown ex-situ and inserted into the sol-gel.

Exemplary organic nanocrystals may be selected from the group comprising tetracene, $C_{60}$ fullerene, anthracene and combinations thereof.

The use of porosity forming agents such as dendrimers and organic nanocrystals which are generally formed ex-situ allows the user to control both the size and shape of the pores in the coating through selection of the molecular geometry of the dendrimers and nanocrystals.

The sol-gel composition further includes a film forming precursor which forms the primary structure or network of the gel and the resulting solid coating. The film forming precursor may be a silicon containing precursor or a titanium containing precursor. Exemplary silicon containing precursors include silane and silicon alkoxide containing precursors. The silicon containing precursor may be in liquid form. Exemplary silicon containing precursors include alkyl containing silicon precursors such as tetraalkylorthosilicate, alkyltrialkoxysilane, alkyltrialkylsilane (where each alkyl group may independently be any alkyl group, such as, methyl, ethyl, propyl, butyl, pentyl, hexyl, heptyl, octyl, nonyl, decyl, etc.). Exemplary silane containing precursors or metal alkoxide containing precursors may be selected from the group comprising: tetraethylorthosilicate (TEOS), 3-glycidoxypropyltrimethoxysilane (Glymo), octadecyltrimethoxysilane (OTS), propyltriethoxysilane (PTES), methyltriethoxysilane (MTES), (heptadecafluoro) 1,1,2,2-tetrahydrodecyltrimethoxysilane, hexamethyldisilazane (HMDS), and combinations thereof. Exemplary titanium precursors include titanium alkoxide and titanium chloride precursors.

For certain embodiments which use longer alkyl chain silanes such as 3-glycocidoxylpropyltrimethoxysilane (glymo) as the silicon containing precursor, these longer alkyl chain silanes may form micropores (pores less than 1 nanometer in size) due to the combustion of the alkyl (hydrocarbon) chain. In this case, the longer alkyl chain silane molecule itself may also act as a molecular porogen. These longer alkyl chain silanes may be used as a precursor in conjunction with the porosity forming agent to produce porous coatings with graded porosity having a combination of macro and micropores.

The amount of film forming precursor may comprise at least 0.1 wt. %, 1 wt. %, 3 wt. %, 5 wt. %, 7 wt. %, 9 wt. %, 11 wt. %, 13 wt. %, 15 wt. %, 17 wt. %, or 19 wt. % of the total weight of the sol-gel formulation. The amount of film forming precursor may comprise up to 3 wt. %, 5 wt. %, 7 wt. %, 9 wt. %, 10 wt. %, 11 wt. %, 13 wt. %, 15 wt. %, 17 wt. %, 19 wt. %, or 20 wt. % of the total weight of the sol-gel formulation. The film forming precursor may be present in the sol-gel formulation in an amount between about 1 wt. % and about 20 wt. % of the total weight of the sol-gel composition. The film forming precursor may be present in the sol-gel formulation in an amount between about 0.1 wt. % and about 10 wt. % of the total weight of the sol-gel composition. The amount of film forming precursor may correspond to 1-5% final ash content in the final sol formulation.

The sol-gel composition may further include an acid or base catalyst for controlling the rates of hydrolysis and condensation. The acid or base catalyst may be an inorganic or organic acid or base catalyst. Exemplary acid catalysts may be selected from the group comprising hydrochloric acid (HCl), nitric acid ($HNO_3$), sulfuric acid ($H_2SO_4$), acetic acid ($CH_3COOH$), and combinations thereof. Exemplary base catalysts include tetramethylammonium hydroxide (TMAH).

The acid catalyst level may be 0.001 to 10 times stoichiometric molar precursor (the film forming precursor). The acid catalyst level may be from 0.001 wt. % to 0.1 wt. % of the total weight of the sol-gel composition. The base catalyst level may be from 0.001 to 10 times molar precursor (the film forming precursor). The base catalyst level may be from 0.001 wt. % to 0.1 wt. % of the total weight of the sol-gel composition.

The sol-gel composition further includes a solvent system. The solvent system may include a non-polar solvent, a polar aprotic solvent, a polar protic solvent, and combinations thereof. Selection of the solvent system and the porosity forming agent may be used to influence the formation and size of pores. Exemplary solvents include alcohols, for example, n-butanol, isopropanol, n-propanol, ethanol, methanol, and other well known alcohols. The amount of solvent may be from 80 to 95 wt. % of the total weight of the sol-gel composition.

The solvent system may further include water. Water may be present in 0.5 to 10 times the stoichiometric amount need to hydrolyze the silicon containing precursor molecules. Water may be present from 0.001 to 0.1 wt. % of the total weight of the sol-gel composition.

The sol-gel composition may further include a surfactant. In certain embodiments, the surfactant may be used for stabilizing the sol-gel composition. In certain embodiments, the surfactant may be a self-assembling molecular porogen which is used as an additional porosity forming agent. The surfactant may be selected from the group comprising: non-ionic surfactants, cationic surfactants, anionic surfactants, and combinations thereof. Exemplary non-ionic surfactants include non-ionic surfactants with linear hydrocarbon chains and non-ionic surfactants with hydrophobic trisiloxane groups. The surfactant may be a trisiloxane surfactant. Exemplary self assembling molecular porogens may be selected from the group comprising: polyoxyethylene stearyl ether, benzoalkoniumchloride (BAC), cetyltrimethylammoniumbromide (CTAB), 3-glycidoxypropyltrimethoxysilane, polyethyleneglycol (PEG), ammonium lauryl sulfate (ALS), dodecyltrimethylammoniumchloride (DTAC), polyalkyleneoxide modified hepta-methyltrisiloxane, and combinations thereof.

Exemplary surfactants are commercially available from Momentive Performance Materials under the tradename SILWET® surfactant and from SIGMA ALDRICH® under the tradename BRIJ® surfactant. Suitable commercially available products of that type include SILWET® L-77 surfactant and BRIJ® 78 surfactant.

In certain embodiments, where the surfactant is used as a stabilizer, the surfactant may be present in the sol-gel composition in an amount between about 0.0001% and about 0.003 wt % of the total weight of the sol-gel composition.

In certain embodiments, where the surfactant is used as a self assembling molecular porogen, the self-assembling molecular porogen may be present in the sol-gel composition in an amount between about 0.1 and about 5 wt. % of the total weight of the sol-gel composition.

At block 120, a substrate is coated with the sol-gel composition. Exemplary substrates include glass, silicon, metallic coated materials, or plastics. The substrate may be a transparent substrate. The substrate may be flat, curved or any other shape as necessary for the application under consideration. The substrate may be textured or patterned. Exemplary glass substrates include high transmission low iron glass, borosilicate glass (BSG), sodalime glass and standard clear glass. The sol-gel composition may be coated on the substrate using, for example, dip-coating, spin coating, curtain coating, roll coating, capillary coating or a spray coating process. Other application methods known to those skilled in the art may also be used. The substrate may be coated on a single side or on multiple sides of the substrate.

At block 130, the coating on the substrate is dried to form a gel. A gel is a coating that has both liquid and solid characteristics and may exhibit an organized material structure (e.g., a water based gel is JELL-O®). During the drying, the solvent of the sol-gel composition is evaporated and further bonds between the components, or precursor molecules, may be formed. The drying may be performed by exposing the coating on the substrate to the atmosphere at room temperature. The coatings (and/or the substrates) may alternatively be exposed to a heated environment at a boiling point above the solvent, low pressure regions, or heated or room temperature air flow to elevate the rate of solvent evaporation. The drying of the coatings may not require elevated temperatures, but may vary depending on the composition of the sol-gel compositions used to form the coatings. In one embodiment, the drying temperature may be in the range of approximately 25 degrees Celsius to approximately 200 degrees Celsius. In one embodiment, the drying temperature may be in the range of approximately 50 degrees Celsius to approximately 60 degrees Celsius. The drying process may be performed for a time period of between about 1 minute and 10 minutes, for example, about 6 minutes. Drying temperature and time are dependent on the boiling point of the solvent used during sol formation.

At block 140, the at least porosity forming agent is removed to form the porous coating. The at least one porosity forming agent may be removed by exposing the coating (and/or substrate) to an annealing process to form a porous coating. The annealing temperature and time may be selected based on the chemical composition of the sol-gel composition, depending on what temperatures may be required to form cross-linking between the components throughout the coating. In one embodiment, the annealing temperature may be in the range of 500 degrees Celsius and 1,000 degrees Celsius. In one embodiment, the annealing temperature may be 600 degrees Celsius or greater. In another embodiment, the annealing temperature may be between 625 degrees Celsius and 650 degrees Celsius. The annealing process may be performed for a time period of between about 3 minutes and 1 hour, for example, about 6 minutes.

The porous coating layer in one embodiment may have a thickness greater than 50 nanometers. The porous coating layer in another embodiment may have a thickness between about 50 nanometers and about 1,000 nanometers. The porous coating layer in yet another embodiment may have a thickness between about 100 nanometers and about 200 nanometers. The porous coating layer in still yet another embodiment may have a thickness of about 150 nanometers.

The pores of the porous layer may on average be between about 2 nm and about 10 nm. The pores of the porous coating may on average be between about 2 nanometers and about 3 nanometers. The porous coating may have a pore fraction of between about 0.3 and about 0.6. The porous coating may have a porosity of between about 20% and about 60% as compared to a solid film formed from the same material.

In one embodiment, the coating may be a single coating. In alternate embodiments, the coating may be formed of multiple coatings on the same substrate. In such an embodiment, the coating, gel-formation, and annealing may be repeated to form a multi-layered coating with any number of layers. The multi-layers may form a coating with graded porosity. For example, in certain embodiments it may be desirable to have a coating which has a higher porosity adjacent to air and a lower porosity adjacent to the substrate surface. A graded coating may be achieved by modifying various parameters, such as, the type of porosity forming agent, the anneal time, and the anneal temperature.

At block 150, the porous coating may optionally be exposed to a silane-based solution. Exposing the porous coating to a silane-based solution will impart hydrophobic properties to the film leading to reduced moisture content. A portion of the silane forms a covalent bond with the network while a hydrophobic portion of the silane remains exposed forming a hydrophobic monolayer which repels water. The silane-based solution may include a solvent and a silane. Exemplary solvents include ethanol, propanol, butanol chloroform, and dimethylformamide (DMF). Exemplary silanes include silanes selected from the group comprising propyltriethoxysilane (PTES), octadecyltrimethoxysilane (OTS), (heptadecafluoro)-1,1,2,2-tetrahydrodecyltrimethoxysilane, hexamethyldisilazane (HMDS), and combinations thereof. The concentration of the silane could be from 1 micromolar to 10 milimolar in one of the aforementioned solvents. It should also be noted that these silane based solutions may be reapplied to the porous coating if needed to maintain the hydrophobic properties.

At block 160, the porous coating may be exposed to plasma to seal the top layer of the pores to make the film more moisture resistant while preserving the optical properties of the film. The plasma may be RF or DC plasma. In certain embodiments, the pores may be sealed using a molecular masking layer. One exemplary masking layer includes a polymeric layer which may be a few nanometers thick and doesn't significantly impact the overall refractive index of the film. Another exemplary masking layer could be a vacuum deposited metal oxide layer of 2-5 nanometers thickness such as $TiO_2$.

EXAMPLES

It is believed that the following examples further illustrate the objects and advantages of the embodiments. The particular materials and amounts thereof, as well as other conditions and details, recited in these examples should not be used to limit embodiments described herein. Unless stated otherwise all percentages, parts and ratios are by weight. Examples of the invention are numbered while comparative samples, which are not examples of the invention, are designated alphabetically.

Example #1

Tetraethylorthosilicate (TEOS) corresponding to 3% total ash content (based on equivalent weight of $SiO_2$ produced) in the final formulation was mixed with water (2 times stoichiometric amount based on TEOS), nitric acid (0.02 times the molar TEOS amount) and n-propanol (10-100 times molar TEOS). The solution was stirred for 24 hours at room temperature or elevated temperature (50-60 degrees Celsius). The solution was cooled to room temperature and mixed with an additional amount of n-propanol to bring the total ash content of the solution to 3%. DNT-102 dendrimers (Gen 1, Mol. Wt. 1458, diameter 1.9 nanometer, commercially available from DENDRITIC NANOTECHNOLOGIES, INC.™) were added to this solution at 3% mass level to act as a porosity forming agent. The solution was either dip (coating speed ~10 mm/sec) or spin coated (1,000-1,400 rpm) on pre-cleaned borosilicate (BSG) or sodalime glass to achieve a film thickness of around ~150 nm after annealing. The glass substrate was then dried at 150 degrees Celsius for 30 minutes in an oven to evaporate all the solvent and then annealed at 625-650 degrees Celsius for 6 minutes. The glass substrate was cooled on a steel slab and characterized to determine the film thickness, refractive index (RI) and improvement in transmittance of light.

Example #2

A porous coating prepared as described in example #1 was treated with 10 mM of PTES solution prepared in n-propanol for 20 minutes, dried using nitrogen and stored along with untreated film.

The impact of moisture absorption was studied on both the PTES treated samples and untreated samples. The treated and untreated samples were exposed to atmosphere and the refractive index of the treated and untreated samples was monitored over time (e.g., every twenty-four hours). It was observed that the coating modified using PTES retained its optical properties better than the untreated film over one week's time (RI, % transmission change etc). Thus the film treated with PTES was more hydrophobic or moisture resistant to moisture absorption than the untreated porous coating.

Example #3

A porous coating prepared as described in example #1 was treated in a vacuum oven containing HMDS vapors mixed with nitrogen for approximately 15 minutes and stored along with an untreated film.

The impact of moisture absorption was studied on both the HDMS treated samples and the untreated samples and it was observed that the porous coating modified using HMDS retained its optical properties better than the untreated film over one week's time. Thus the film treated with HMDS was more hydrophobic or moisture resistant to moisture absorption than the untreated porous coating.

Figure 2:
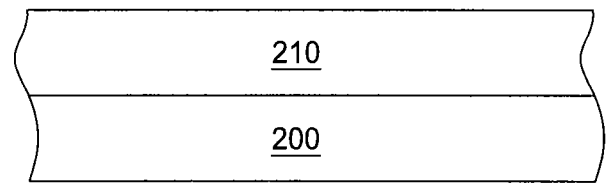
FIG. 2 is a schematic diagram illustrating one embodiment of a porous coating on a glass substrate according to embodiments described herein.

FIG. 2 is a schematic diagram illustrating one embodiment of a porous antireflective coating (ARC) 210 on a glass substrate 200 according to embodiments described herein. The porous antireflective coating 210 was produced using sol-gel compositions comprising the porosity forming agent and methods as described herein.

Figure 3:
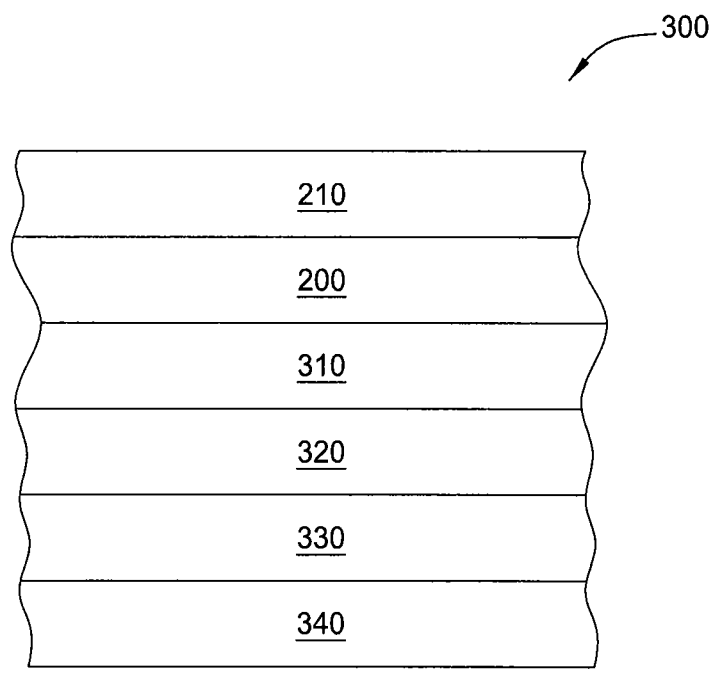
FIG. 3 is a schematic diagram illustrating one embodiment of a photovoltaic cell comprising a porous coating according to embodiments described herein.

FIG. 3 is a schematic diagram illustrating one embodiment of a photovoltaic cell 300 comprising a porous antireflective coating formed sol-gel composition comprising the porosity forming agent and methods as described herein. The photovoltaic cell 300 comprises the glass substrate 200 and the porous antireflective coating as shown in FIG. 2. In this example embodiment, the incoming or incident light from the sun or the like is first incident on the AR coating 210, passes therethrough and then through the glass substrate 200 and front transparent conductive electrode before reaching the photovoltaic semiconductor (active film) 320 of the solar cell. The photovoltaic cell 300 may also include, but does not require, a reflection enhancement oxide and/or EVA film 330, and/or a back metallic or otherwise conductive contact and/or reflector 340 as shown in example FIG. 3. Other types of photovoltaic devices may of course be used, and the photovoltaic device 300 is merely exemplary. As explained above, the AR coating 210 may reduce reflections of the incident light and permits more light to reach the thin film semiconductor film 320 of the photovoltaic device 300 thereby permitting the device to act more efficiently.

Embodiments described herein have provided improved low refractive index porous coatings which exhibit increased durability. Through the use of dendrimers and organic nanocrystals formed ex-situ, the embodiments described herein also provide for control over the shape and size of the pores formed within the low refractive index porous coating.

While the foregoing is directed to embodiments of the invention, other and further embodiments of the invention may be devised without departing from the basic scope thereof.

What is claimed is:

1. A method of forming a porous low refractive index coating on a substrate, comprising:
   coating a substrate with a sol-gel composition comprising at least one porosity forming agent, wherein the porosity forming agent is selected from, trimethylol propane (TMP)-cored dendrimers, tetracene nanocrystals, and combinations thereof; and
   annealing the coated substrate to remove the at least one porosity forming agent to form the porous coating,
   wherein annealing the coated substrate to remove the at least one porosity forming agent comprises heating the coated substrate to a temperature equal or greater than 600 degrees Celsius.

2. The method of claim 1, wherein the annealing the coated substrate comprises heating the coated substrate to a temperature of greater than 600 degrees Celsius.

3. The method of claim 1, wherein the annealing the coated substrate comprises heating the coated substrate to a temperature between 625 degrees Celsius and 650 degrees Celsius.

4. The method of claim 1, wherein the at least one porosity forming agent is present in the sol-gel composition in an amount from about 0.1 wt. % to 5 wt. % of the total weight of the sol-gel composition.

5. The method of claim 1, further comprising:
   drying the sol-gel composition coated on the substrate to form a gel on the substrate.

6. The method of claim 1, wherein the substrate is a glass substrate.

7. The method of claim 1, wherein the sol-gel composition further comprises a film forming precursor selected from the group comprising: 3-glycidoxypropyltrimethoxysilane (Glymo), octadecyltrimethoxysilane (OTS), propyltriethoxysilane (PTES), (heptadecafluoro) 1,1,2,2-tetrahydrodecyltrimethoxysilane, and combinations thereof.

8. The method of claim 1, further comprising:
   exposing the porous coating to a silane-based solution to improve the hydrophobicity of the porous coating.

9. The method of claim 8, wherein the silane-based solution comprises a silane selected from the group comprising propyltriethoxysilane (PTES), octadecyltrimethoxysilane (OTS), (heptadecafluoro)-1,1,2,2-tetrahydrodecyltrimethoxysilane, and combinations thereof.

10. The method of claim 1, further comprising:
    exposing the porous coating to a plasma to seal the pores of the porous coating.

11. A method of making a sol-gel system, comprising:
    mixing a film forming precursor, an acid or base containing catalyst, water, and an alcohol containing solvent to form a reaction mixture by at least one of a hydrolysis and polycondensation reaction; and
    adding at least one porosity forming agent comprising trimethylol propane (TMP)-cored dendrimers, tetracene nanocrystals, or combinations thereof to the reaction mixture.

12. The method of claim 11, further comprising a stabilizer selected from the group comprising: polyoxyethylene stearyl ether, 3-glycidoxypropyltrimethoxysilane, polyethyleneglycol (PEG), ammonium lauryl sulfate (ALS), dodecyltrimethylammoniumchloride (DTAC), benzoalkonium chloride (BAC), polyalkyleneoxide modified hepta-methyltrisiloxane, and combinations thereof.

13. The method of claim 11, further comprising:
    heating the reaction mixture to between about 50 degrees Celsius and 60 degrees Celsius;
    cooling the heated reaction mixture to room temperature; and
    adding additional alcohol containing solvent to the cooled reaction mixture prior to the adding at least one porosity forming agent.

14. The method of claim 11, wherein the film forming precursor is a silane containing precursor or metal alkoxide containing precursor selected from the group comprising: 3-glycidoxypropyltrimethoxysilane (Glymo), octadecyltrimethoxysilane (OTS), propyltriethoxysilane (PTES), (heptadecafluoro) 1,1,2,2-tetrahydrodecyltrimethoxysilane, and combinations thereof.

* * * * *